(12) United States Patent
Li

(10) Patent No.: US 12,683,957 B2
(45) Date of Patent: Jul. 14, 2026

(54) METHOD FOR AUTHENTICATING IDENTITY, AND TERMINAL, STORAGE MEDIUM, AND PROGRAM PRODUCT THEREOF

(71) Applicant: BIGO TECHNOLOGY PTE. LTD., Mapletree Business City (SG)

(72) Inventor: Yan Li, Guangzhou (CN)

(73) Assignee: BIGO TECHNOLOGY PTE. LTD., Mapletree Business City (SG)

( * ) Notice: Subject to any disclaimer, the term of this patent is extended or adjusted under 35 U.S.C. 154(b) by 10 days.

(21) Appl. No.: 18/839,570

(22) PCT Filed: Feb. 25, 2022

(86) PCT No.: PCT/CN2022/077889
§ 371 (c)(1),
(2) Date: Aug. 19, 2024

(87) PCT Pub. No.: WO2023/159462
PCT Pub. Date: Aug. 31, 2023

(65) Prior Publication Data
US 2025/0158980 A1 May 15, 2025

(51) Int. Cl.
*H04L 9/40* (2022.01)

(52) U.S. Cl.
CPC ........ *H04L 63/083* (2013.01); *H04L 63/0861* (2013.01)

(58) Field of Classification Search
None
See application file for complete search history.

(56) References Cited

U.S. PATENT DOCUMENTS 9,430,634 B1 * 8/2016 Dotan .................... G06F 21/36
9,880,629 B2 1/2018 Moscarillo
(Continued)

FOREIGN PATENT DOCUMENTS

CN 101291226 A 10/2008
CN 101770657 A 7/2010
(Continued)

OTHER PUBLICATIONS

Extended European search report of counterpart European application No. 22927748.8 issued on Jan. 20, 2025.
(Continued)

*Primary Examiner* — Cai Y Chen
(74) *Attorney, Agent, or Firm* — Dilworth & Barrese, LLP.; Michael J. Musella, Esq.

(57) ABSTRACT

Provided is a method for authenticating identity. The method includes: generating a target random mapping function in response to an identity verification instruction, wherein a random mapping function is a function defined to randomly map characters into gestures; displaying a virtual keyboard based on the target random mapping function, wherein password conversion prompt information corresponding to the target random mapping function is displayed in the virtual keyboard and is defined to prompt to convert password characters in an original password into gestures; acquiring facial feature data by performing facial feature extraction on identity verification images collected by a camera; acquiring a gesture sequence by performing activity detection on the identity verification images; acquiring the original password by performing password conversion on the gesture sequence based on the target random mapping function; and performing identity authentication based on the original password and the facial feature data.

20 Claims, 4 Drawing Sheets

Backend server 120

Terminal 110

(56) References Cited

U.S. PATENT DOCUMENTS

| | | | |
|---|---|---|---|
| 10,509,951 B1 | 12/2019 | Nagalla | |
| 10,619,558 B2 * | 4/2020 | Joisten-Pieritz | ............................. |
| | | | F02M 35/10222 |
| 10,733,275 B1 | 8/2020 | Knas et al. | |
| 2007/0118758 A1 | 5/2007 | Takahashi et al. | |
| 2013/0167212 A1 | 6/2013 | Azar et al. | |
| 2014/0101595 A1 | 4/2014 | Kumara et al. | |
| 2016/0164681 A1 | 6/2016 | Jiang et al. | |
| 2017/0180362 A1 | 6/2017 | Du | |
| 2018/0196966 A1 | 7/2018 | Herger et al. | |
| 2020/0169566 A1 | 5/2020 | Wolf et al. | |
| 2021/0117529 A1 | 4/2021 | Zamora Martínez et al. | |

FOREIGN PATENT DOCUMENTS

| | | | |
|---|---|---|---|
| CN | 102004872 A | 4/2011 | |
| CN | 102186169 A | 9/2011 | |
| CN | 102789572 A | 11/2012 | |
| CN | 103593598 A | 2/2014 | |
| CN | 105468950 A | 4/2016 | |
| CN | 106850228 A | 6/2017 | |
| CN | 109624925 A | 4/2019 | |
| CN | 110955874 A | 4/2020 | |
| CN | 111611976 A | 9/2020 | |
| CN | 211699105 U | 10/2020 | |
| CN | 112528259 A | 3/2021 | |
| CN | 113051536 A | 6/2021 | |
| KR | 20060021614 A | 3/2006 | |
| RU | 2629541 C2 | 8/2017 | |
| WO | 2020082164 A1 | 4/2020 | |
| WO | 2021244531 A1 | 12/2021 | |

OTHER PUBLICATIONS

Yuting Lin, Face Recognition for Access Control with Visual Pin, Ip.Com, Ip.Com Inc., West Henrietta, NY, US, Jul. 6, 2018, ISSN: 1533-0001, pp. 1-4.

Decision to Grant a Patent of Japanese application No. 2024-550261 issued on Feb. 12, 2025.

Decision on Grant a patent for invention of Russian application No. 2024125071/28 issued on Jan. 20, 2025.

International search report of PCT application No. PCT/CN2022/077889 issued on Apr. 12, 2022.

China National Intellectual Property Administration, First office action of Chinese application No. 202280000280.9 issued on Jul. 29, 2023, which is the foreign counterpart application of this US application.

Ruirui Zhou et al., Overview of Identity Authentication Patent Technologies, Henan Science and Technology, Jan. 25, 2020, pp. 147-152 , Issue 3.

China National Intellectual Property Administration, Notification to grant patent right for invention of Chinese application No. 202280000280.9 issued on Dec. 16, 2023, which is foreign counterpart application of this US application.

Jiayuan Lu et al., Application of Fingerprint Identification Technology in Bank Counter Operations, Financial Computer of Huanan, May 10, 2006, pp. 97-103, Issue No. 5.

\* cited by examiner

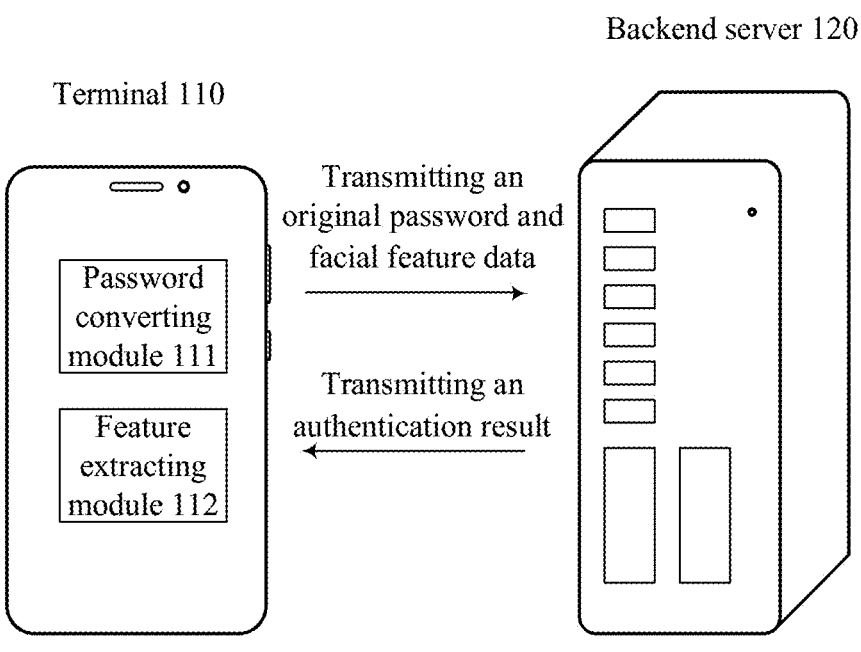

FIG. 1

| |
|---|
| Displaying password conversion prompt information in response to an identity verification instruction — 201 |
| ↓ |
| Acquiring facial feature data by performing facial feature extraction on identity verification images collected by a camera — 202 |
| ↓ |
| Acquiring a gesture sequence by performing activity detection on the identity verification images — 203 |
| ↓ |
| Acquiring an original password by performing password conversion on the gesture sequence — 204 |
| ↓ |
| Performing identity authentication based on the original password and the facial feature data — 205 |

FIG. 2

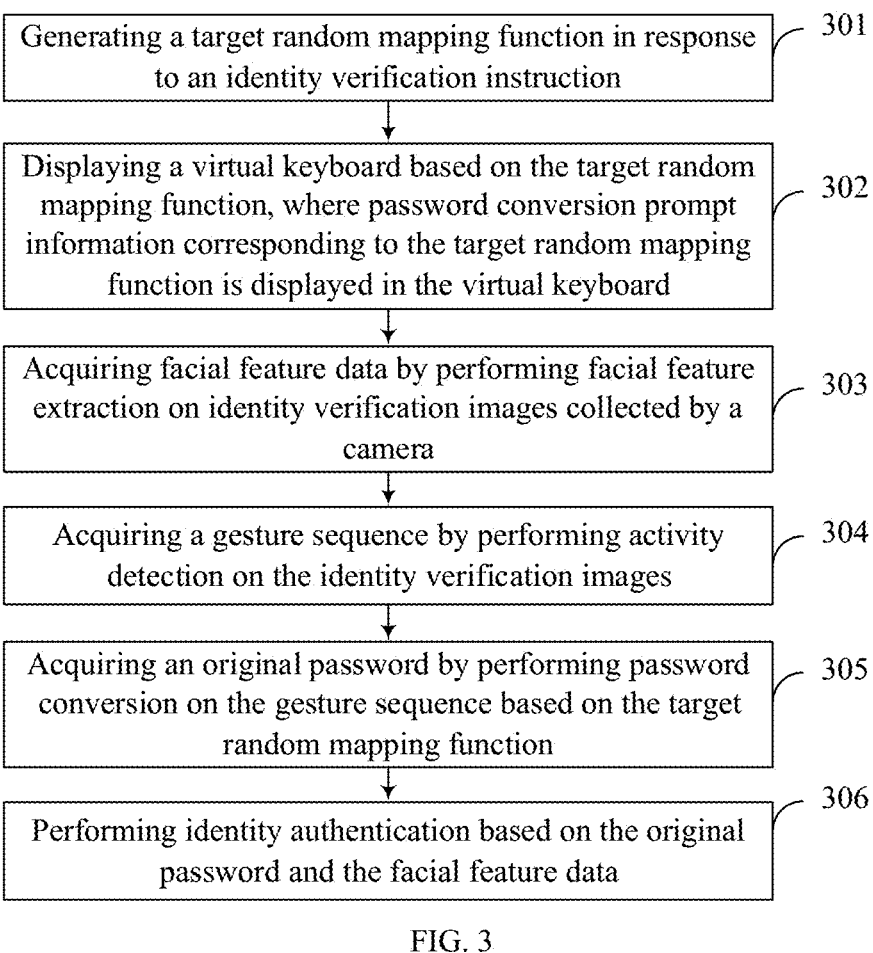

Generating a target random mapping function in response to an identity verification instruction — 301

Displaying a virtual keyboard based on the target random mapping function, where password conversion prompt information corresponding to the target random mapping function is displayed in the virtual keyboard — 302

Acquiring facial feature data by performing facial feature extraction on identity verification images collected by a camera — 303

Acquiring a gesture sequence by performing activity detection on the identity verification images — 304

Acquiring an original password by performing password conversion on the gesture sequence based on the target random mapping function — 305

Performing identity authentication based on the original password and the facial feature data — 306

FIG. 3

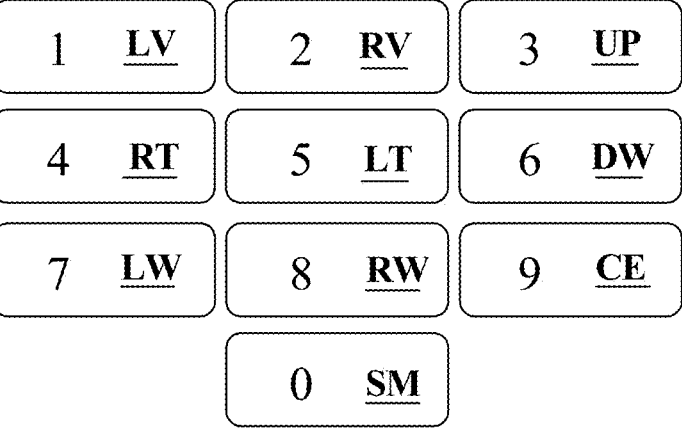

| 1 | LV | 2 | RV | 3 | UP |
| 4 | RT | 5 | LT | 6 | DW |
| 7 | LW | 8 | RW | 9 | CE |
| | | 0 | SM | | |

FIG. 4

METHOD FOR AUTHENTICATING IDENTITY, AND TERMINAL, STORAGE MEDIUM, AND PROGRAM PRODUCT THEREOF

This application is a U.S. national stage of international application No. PCT/CN2022/077889, filed on Feb. 25, 2022, the disclosure of which is herein incorporated by references in its entirety.

TECHNICAL FIELD

Embodiments of the present disclosure relate to the field of cloud security technologies, in particular, to a method and apparatus for authenticating identity, and a terminal, a storage medium, and a program product thereof.

BACKGROUND

Two-factor authentication (2FA) refers to a method for authenticating user identities by combining two different types of authentication factors (such as account passwords, short message service (SMS) verification codes, and biometric features). In the process of identity verification, the users need to provide two different authentication factors to prove their identities, which can better protect user credentials and accessible resources as compared with a verification method using a single factor.

SUMMARY

The embodiments of the present disclosure provide a method and apparatus for authenticating identity, and a terminal, a storage medium, and a program product thereof. The technical solutions are as follows.

Some embodiments of the present disclosure provide a method for authenticating identity. The method includes:

generating a target random mapping function in response to an identity verification instruction, wherein the target random mapping function is a function defined to randomly map characters into gestures;

displaying a virtual keyboard based on the target random mapping function, wherein password conversion prompt information corresponding to the target random mapping function is displayed in the virtual keyboard and is defined to prompt to convert password characters in an original password into gestures, different password characters correspond to different gestures, a password character conversion mode indicated by the password conversion prompt information is randomly generated, and the password characters include at least one type of numbers, letters, punctuation marks, special symbols; wherein displaying the virtual keyboard based on the target random mapping function includes: determining a password converting unit based on the target random mapping function, wherein the password converting unit includes one of the password characters and a gesture corresponding to the one of the password characters in the target random mapping function; and displaying the password converting unit in the virtual keyboard based on a first display mode corresponding to the one of the password characters and a second display mode corresponding to a gesture identifier of the gesture, wherein the first display mode is different from the second display mode;

acquiring facial feature data by performing facial feature extraction on identity verification images collected by a camera;

acquiring a gesture sequence by performing activity detection on the identity verification images;

acquiring the original password by performing password conversion on the gesture sequence based on the target random mapping function; and performing identity authentication based on the original password and the facial feature data.

Some embodiments of the present disclosure provide a terminal including a processor and a memory, where the memory stores at least one instruction, at least one program, a code set, or an instruction set thereon, and the processor, when loading and executing the at least one instruction, the at least one program, the code set, or the instruction set, is caused to perform the method for authenticating identity as defined in the above embodiments.

Some embodiments of the present disclosure provide a non-transitory computer-readable storage medium storing at least one computer program therein, where the computer program, when loaded and run by a processor, causes the processor to perform the method for authenticating identity as defined in the above embodiments.

According to some embodiments of the present disclosure, a computer program product or computer program is provided. The computer program product or computer program includes computer instructions stored in a computer-readable storage medium. A processor of a terminal reads the computer instructions from the computer-readable storage medium, and the processor, when executing the computer instructions, causes the terminal to perform the method for authenticating identity provided in various embodiments of the above embodiments.

BRIEF DESCRIPTION OF THE DRAWINGS

FIG. 1 is a schematic diagram of an implementation environment according to some embodiments of the present disclosure;

FIG. 2 shows a flowchart of a method for authenticating identity according to some embodiments of the present disclosure;

FIG. 3 shows a flowchart of a method for authenticating identity according to some embodiments of the present disclosure;

FIG. 4 is a schematic diagram of a virtual keyboard according to some embodiments of the present disclosure;

DETAILED DESCRIPTION

Figure 5:
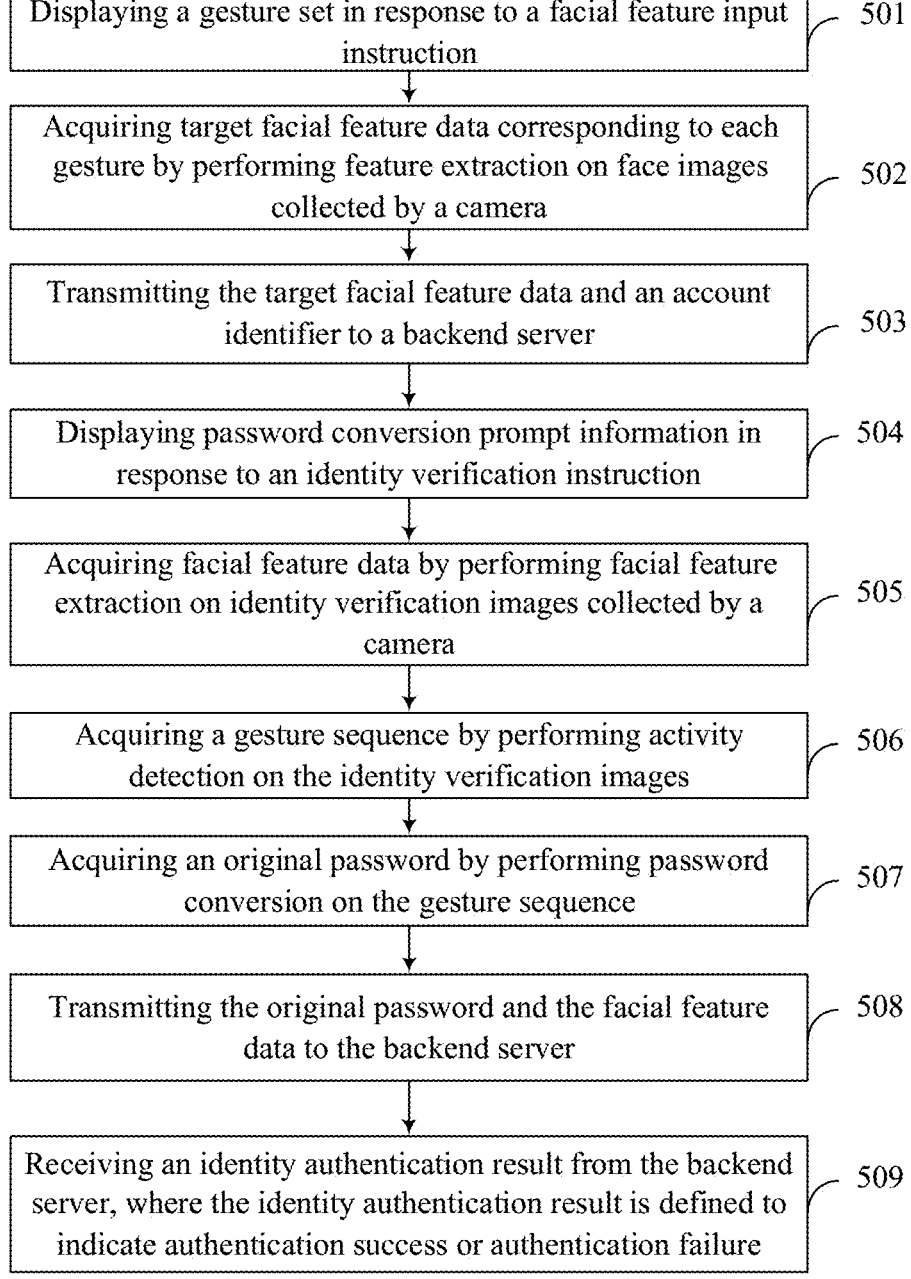
FIG. 5 shows a flowchart of a method for authenticating identity according to some embodiments of the present disclosure.

For clearer descriptions of the objectives, technical solutions, and advantages of the present disclosure, embodiments of the present disclosure are further described in detail hereinafter with reference to the accompanying drawings.

The mentioned term "a plurality of" herein means two or more. The term "and/or" describes the association relationship of the associated objects, and indicates that three types of relationships. For example, the phrase "A and/or B" means (A), (B), or (A and B). The symbol "/" generally indicates an "or" relationship between the associated objects.

In some practices, the 2FA generally utilizes two of the following three authentication factors: (1) user private information, such as user passwords or PINS; (2) user biometric feature information, such as voiceprint features, facial features, fingerprint features, and the like; and, (3) user personal items, such as SMS verification codes, electronic tokens, and the like. However, for the methods for authenticating identity in the some practices, the 2FA method based on the voiceprint features and other biometric features (for example, fingerprints and faces) requires a user device to be provided with additional special sensors (for example, a fingerprint sensor) or additional software and hardware tokens; and the 2FA solution based on the passwords and the graphic codes often requires the user to input information for multiple rounds. The methods for authenticating identity based on two types of biometric features, based on the passphrases and the passwords, and based on the user biometric features and the user private information all require the users to perform at least two input verify operations, such as inputting voiceprints and fingerprints, or inputting fingerprints and passwords, such that the verify operations are complex, and the verification process is long.

The embodiments of the present disclosure provide a method for identity verification to solve the above technical problems, improve the efficiency of 2FA, and simplify the process. FIG. 1 shows a schematic diagram of an implementation environment according to some embodiments of the present disclosure. The implementation environment includes: a terminal 110 and a backend server 120.

The terminal 110 includes a password converting module 111 and a feature extracting module 112. In response to receiving an identity verification instruction, the password converting module 111 generates a password character conversion mode, and the password character conversion mode is randomly generated. The terminal 110 displays the password character conversion mode over an interface, a user converts an original password based on the mode and inputs a gesture sequence through a camera, and the terminal 110 performs feature extraction and activity detection on identity verification images collected by the camera. The password converting module 111 acquires the original password by restoring the identified gesture sequence based on the password character conversion mode. The feature extracting module 112 acquires facial feature data by performing facial feature extraction on the identity verification images. The terminal 110 transmits the original password and the facial feature data to the backend server 120 for identity authentication. Therefore, the method achieves the input of two authentication factors by using the same user data once, and the user operation process is simplified.

Upon receiving the original password and the facial feature data, the backend server 120 performs identity authentication based on a database, and transmits an authentication result to the terminal 110. Although only one terminal 110 is shown in FIG. 1, more terminals communicate with the backend server 120 in practical applications for identity authentication. The backend server 120 stores the original passwords and the facial feature data corresponding to various accounts.

Application scenarios of the method for authenticating identity according to the embodiments of the present disclosure are illustratively described hereinafter.

1. On-Line Payment

The method for authenticating identity is implementable as an on-line payment function in an application, such as a shopping application or an on-line payment application, or in a web page, such that a 2FA process is implemented through a single input. In response to receiving a pay operation, a terminal randomly generates a password character conversion mode, displays the password character conversion mode over an interface, and collects identity verification images by turning on a camera. The user converts an original password of her/his account into an instant gesture sequence based on the password character conversion mode displayed by the terminal, and shows corresponding gestures to the camera. The terminal acquires facial feature data by performing the feature extraction on the identity verification images, identifies a gesture sequence, performs identity authentication based on the original password and the facial feature upon acquiring the original password by restoring the identified gesture sequence, and completes the pay operation in the case that the 2FA succeeds.

2. Account Login

For user accounts involving important information or resources of users, the above method for authenticating identity is applicable to identity authentication during login. In the case that an account login operation is received, a user inputs an account identifier, starts an identity authentication process, and inputs an original password and a facial feature at one time through an input gesture sequence for identity authentication. In addition, the method for authenticating identity is applicable to an account login scenario to an application and a web page in a terminal.

FIG. 2 shows a flowchart of a method for authenticating identity according to some embodiments of the present disclosure. The embodiments are described by taking the method being applicable to a terminal provided with image collection and image processing functions as an example. The method includes the following steps.

In S201, password conversion prompt information is displayed in response to an identity verification instruction.

The password conversion prompt information is defined to prompt to convert password characters in an original password into gestures, different password characters correspond to different gestures, and a password character conversion mode indicated by the password conversion prompt information is randomly generated.

In some embodiments, the identity authentication requires acquisition of two authentication factors, that is, the user password and the facial feature. Face identification is used in the embodiments of the present disclosure to simplify the identity authentication process of the user, such that the input of the above two authentication factors is achieved in a single operation. The terminal provides the random password character conversion mode to prevent the original password from being leaked. In response to receiving the identity verification instruction, the terminal provides the password character conversion mode to the user by displaying the password conversion prompt information. The user needs to convert the original password of her/his account into an instant gesture sequence based on the password character conversion mode provided by the terminal, and then perform the gesture sequence for input through a camera of the terminal. The password character conversion mode is randomly generated and is a non-fixed conversion mode, such that the password character conversion mode cannot be cracked by others.

In some embodiments, the password character conversion mode achieves conversion between characters and gestures, and maps the characters to the gestures that can be performed by the user. For example, the characters include numbers, letters, punctuation marks, special symbols, and the like, and the gestures include facial expressions, head gestures, head and hand combined gestures, and the like, which are not limited in the embodiments of the present disclosure.

In S202, facial feature data is acquired by performing facial feature extraction on identity verification images collected by the camera.

Upon displaying the password conversion prompt information, the terminal turns on the camera, and collects image data, such as videos or pictures, by the camera. Upon collecting the identity verification images, the terminal acquires the facial feature data of the user by performing the facial feature extraction on the identity verification images.

In some embodiments, upon receiving the identity verification instruction, the terminal automatically turns on the camera to collect the identity verification images. Alternatively, the terminal displays the password conversion prompt information, and turns on the camera upon receiving a password input confirm operation (for example, a trigger operation on a face identification control) to collect the images. The terminal turns off the camera to finish image collection in the case that a working duration of the camera reaches a duration threshold. Alternatively, the terminal turns off the camera upon receiving a password input finish operation (for example, a trigger operation on an information input finishing control). Alternatively, the terminal identifies the collected identity verification images in real time, and automatically turns off the camera in the case that no face is detected or the gesture of the user in the images has not changed within a target duration, which is not limited in the embodiments of the present disclosure.

In some embodiments, a feature extracting model is provided in the terminal, and the terminal inputs the identity verification images into the feature extracting model to acquire the facial feature data.

In some embodiments, the identity verification images are pictures captured by the terminal through the camera, or video frame images extracted by the terminal from a video captured through the camera.

In S203, a gesture sequence is acquired by performing activity detection on the identity verification images.

Upon acquiring the identity verification images, the terminal further performs activity detection on the identity verification images, acquires gestures of the user, and determines the gesture sequence in a chronological order.

In some embodiments, a living body detecting model is provided in the terminal, and the terminal inputs the identity verification images into the living body detecting model, and acquires the gesture sequence by identifying the gestures in the images.

In some embodiments, the terminal inputs all the collected identity verification images into the feature extracting model and the living body detecting model. Alternatively, the terminal picks out appropriate images, such as clear images containing complete faces, from the collected identity verification images based on an image collection standard of a face identification system, and inputs the picked images into the feature extracting model and the living body detecting model, such that the efficiency and the accuracy of identity verification are improved.

It should be noted that FIG. 2 only shows a possible process for performing the method, but S202 and S203 are not limited to a strict sequence, and the terminal may alternatively perform S203 prior to S202, or perform S202 and S203 simultaneously.

In S204, the original password is acquired by performing password conversion on the gesture sequence.

Upon acquiring the gesture sequence, the terminal inversely converts the gesture sequence (that is, restores the password by determining which word or words are converted based on the password character conversion mode to acquire the above gesture sequence) based on the password character conversion mode provided by the current identity authentication, such that the original password is acquired.

For example, in the password character conversion mode randomly generated by the terminal, the character "1" corresponds to "Turn head left". In response to detecting the gesture of "Turn head left" in the gesture sequence, the terminal determines that the character corresponding to the gesture is "1".

In S205, identity authentication is performed based on the original password and the facial feature data.

The terminal performs identity authentication based on two factors of the original password and the facial feature data. The terminal confirms the success of the identity authentication only in the case that the original password acquired by "translation" is consistent with a registered password corresponding to the account and the facial feature data is consistent with registered facial feature data corresponding to the account. In the case that any of the factors is inconsistent, the identity authentication fails.

In some embodiments, upon acquiring the original password and the facial feature data, the terminal performs the identity authentication locally. Alternatively, the terminal transmits the original password and the facial feature data to the cloud, and the cloud server performs the identity authentication and feeds back an identity authentication result.

In summary, the embodiments of the present disclosure provide an identity authentication mechanism based on two authentication factors, that is, a user password and a facial feature, such that a user can complete password input and face identification simultaneously only by inputting a gesture once. Thus, the user identity authentication process is simplified, and the efficiency of identity authentication is improved. Based on a random password character conversion mode, the user inputs a random gesture sequence acquired by converting an original password, such that the original password of the user is not leaked in a password input stage, and an instant password acquired based on the correct original password can enable the authentication to succeed to protect face identification from attack of forged facial features and further improve the security and the accuracy of identity authentication are improved.

In some embodiments, the terminal determines the password character conversion mode based on a random mapping function and displays the password character conversion mode through a virtual keyboard. FIG. 3 shows a flowchart of a method for authenticating identity according to some embodiments of the present disclosure. The embodiments are described by taking the method being applicable to a terminal provided with image collection and image processing functions as an example. The method includes the following steps.

In S301, a target random mapping function is generated in response to the identity verification instruction.

The random mapping function is a function defined to randomly map characters into gestures.

In some embodiments, types of gestures are pre-stored in the terminal, and the terminal randomly generates a target random mapping function at each identity authentication to specify a corresponding relation between password characters and gestures. A number of the types of gestures is greater than or equal to a number of types of password characters.

Illustratively, the characters defined to set the password are numbers from 0 to 9, and the terminal generates the target random mapping function $H_{rand}(x)=FaceExp$ as follows:

$H_{rand}(1)=LV$, $H_{rand}(2)=RV$, $H_{rand}(3)=UP$, $H_{rand}(4)=RT$, $H_{rand}(5)=LT$, $H_{rand}(6)=DW$, $H_{rand}(7)=LW$, $H_{rand}(8)=RW$, $H_{rand}(9)=CE$, and $H_{rand}(0)=SM$.

In the target random mapping function, X corresponds to the character, FaceExp corresponds to an identifier of the gesture, and the corresponding relations between the identifier and the gesture are shown in Table 1:

ter and the gesture identifier in the unified key and avoid a long time for the user to identify the character and the identifier in the case that the password character and the gesture identifier are displayed in the same display mode. The first display mode is different from the second display mode by at least one of the following:

A type difference is present between the password character and a character of the gesture identifier; a display color difference is present between the password character and the gesture identifier; a display font difference is present between the password character and the gesture identifier; a display font size difference is present between the password character and the gesture identifier; or a display special effect difference is present between the password character and the gesture identifier.

TABLE 1

| | Gesture | | | | | | | | | | |
|---|---|---|---|---|---|---|---|---|---|---|---|
| | Turn head left | Turn head right | Raise head | Lower head | Skew head to left | Skew head to right | Blink left eye | Blink right eye | Close eyes | Smile | Open mouth |
| Identifier | LV | RV | UP | DW | LT | RT | LW | RW | CE | SM | OM |

In S302, a virtual keyboard is displayed based on the target random mapping function, where the password conversion prompt information corresponding to the target random mapping function is displayed in the virtual keyboard.

The terminal displays the password conversion prompt information over an interface in the form of the virtual keyboard, and a password converting unit group is displayed in the same key of the virtual keyboard. The user first searches for characters in the original password from the virtual keyboard based on the original password, then determines a gesture sequence required to be input based on the password converting units, and then performs corresponding gestures.

In some embodiments, S302 includes the following steps.

In S302a, a password converting unit is determined based on the target random mapping function, where the password converting unit includes a password character and a gesture corresponding to the password character in the target random mapping function.

The terminal determines the password converting units each including the password character and the gesture based on the target random mapping function. The user converts the original password into the gesture sequence based on the password characters in the original password and the password converting units displayed by the terminal.

Based on the example in S301, the terminal determines that the password converting units include (1, LV), (2, RV), (3, UP), (4, DW), (5, LT), (6, RT), (7, LW), (8, RW), (9, CE), and (0, SM).

In some embodiments, the password converting unit includes a password character and a plurality of gestures.

In S302b, the password converting unit is displayed in the virtual keyboard based on a first display mode corresponding to the password character and a second display mode corresponding to a gesture identifier of the gesture, where the first display mode is different from the second display mode.

In some embodiments, the terminal displays the password character and the gesture identifier respectively in two different display modes to distinguish the password charac- Illustratively, FIG. 4 shows a schematic diagram of a virtual keyboard. The virtual keyboard includes 10 keys each displaying a password converting unit. In each password converting unit, the password character is displayed at the left side, and the gesture identifier is displayed at the right side. In the virtual keyboard, compared with the password characters, the gesture identifiers are attached additionally with two display special effects of bolding and underlining. In particular, the gesture identifiers may be different in color from the password characters. For example, the password characters are in black, while the gesture identifiers are in red.

In some embodiments, the password characters and the gesture identifiers are displayed in the virtual keyboard simultaneously, and S302b specifically includes the following steps.

In S1, a first display position of the password character in the virtual keyboard is determined.

In S2, the password converting unit corresponding to each password character is displayed in the virtual keyboard according to the first display position based on the first display mode and the second display mode.

In some embodiments, the display position of the password character in the virtual keyboard is fixed, and the terminal first determines the first display position of the password character in the virtual keyboard and then displays the password character at the first display position.

For example, for the virtual keyboard shown in FIG. 4, the password characters are displayed in the numbers from 1 to 0 each time, in an order from top to bottom and left to right. The terminal first determines first keyboard positions of 10 password characters based on the order, and then displays 10 password converting units corresponding to the 10 password characters at the corresponding first display positions. For example, the password converting unit (1, LV) corresponding to the number 1 is displayed at a key at an upper left corner, and the password converting unit (2, RV) corresponding to the number 2 is displayed at a key at a middle position of a first row.

As the user needs to observe, think, and perform the processes of recalling the original password, searching for the display position of each password character in the original password, determining the gesture corresponding to each password character, and the like, in the case that the terminal simultaneously displays the password characters and the gesture identifiers, much characters are displayed in the virtual keys, which causes confusion. In some embodiments, the terminal first displays the password characters in the virtual keyboard only, and then displays the gesture identifiers upon the user confirms that password conversion can be started. S302*b* further includes the following steps.

In S3, the password character is displayed in the virtual keyboard based on the first display position of the password character in the virtual keyboard and the first display mode.

Similarly, the terminal displays the password characters at the first keyboard positions in the virtual keyboard according to the default order, such that the user quickly determines the display position of each password character in the original password according to a familiar position, which facilitates subsequent determination of the gesture sequence as quickly as possible.

In S4, a second display position of the gesture identifier in the virtual keyboard is determined based on the password character corresponding to the gesture identifier in the password converting unit in response to a conversion mode display operation.

In the case that the user is ready for password conversion, the conversion mode display operation is performed to enable the terminal to display the gesture identifier in the virtual keyboard and display the password converting unit.

In some embodiments, the conversion mode display operation is a trigger operation on a conversion confirmation control, or a password conversion instruction input by a user through voice, which is not limited in the embodiments of the present disclosure.

Upon receiving the conversion mode display operation, the terminal determines the second display position of each gesture identifier based on the password character corresponding to the gesture identifier in the password converting unit and the first display position of the password character.

For example, for the virtual keyboard in FIG. 4, the terminal first displays the number at the left side in each key, and then displays the gesture identifier at the right side upon receiving the conversion mode display operation.

In S5, the gesture identifier is displayed in the virtual keyboard according to the second display position based on the second display mode.

Upon determining the second display positions of all the gesture identifiers, the terminal displays the gesture identifiers in the virtual keyboard, such that the user determines an instant gesture sequence.

The above steps all display the virtual keyboard by fixing the display positions of the password characters. That is, the display positions of the password converting units are determined based on the first display positions of the password characters, and the first display positions are fixed positions to facilitate quick determination of the gesture sequence by the user according to familiar keyboard positions. In practical applications, the first display position may also be random.

In S303, facial feature data is acquired by performing facial feature extraction on identity verification images collected by the camera.

In S304, a gesture sequence is acquired by performing activity detection on the identity verification images.

For specific embodiments of S303 to S304, reference may be made to S202 to S203, which are not repeated again in the embodiments of the present disclosure.

In S305, the original password is acquired by performing password conversion on the gesture sequence based on the target random mapping function.

Upon acquiring the gesture sequence based on the identity verification images, the terminal acquires the password character corresponding to each gesture by performing inverse conversion (restoration) on each gesture in the gesture sequence based on the currently generated target random mapping function, and further determines the original password.

Illustratively, by taking the password character conversion mode in the virtual keyboard shown in FIG. 4 as an example, in the case that the original password is "1234", the user determines that the gesture sequence is "Turn head left-Turn head right-Raise head-Lower head" and performs the gesture sequence. Upon acquiring the gesture sequence "Turn head left-Turn head right-Raise head-Lower head" by collecting and identifying the identity verification images, the terminal analyzes, based on the target random mapping function, that the original password is "1234".

In S306, identity authentication is performed based on the original password and the facial feature data.

For specific embodiments of S306, reference may be made to S205, which are not repeated again in the embodiments of the present disclosure.

In the embodiments of the present disclosure, the terminal generates the target random mapping function, determines the password character conversion mode, and visually displays the password converting units indicated by the target random mapping function in the form of the virtual keyboard, such that the user quickly and correctly converts the password, and the efficiency and the accuracy of password input are improved.

The above embodiments show the processes that the terminal determines and displays the password character conversion mode, and acquires the original password by conversion based on the instant gesture sequence. For the identity authentication step, specifically, the terminal transmits the acquired original password and facial feature data to a backend server, and the backend server determines an identity authentication result based on a database. prior to the identity authentication stage, the user first needs to input her/his own facial feature and the original password for storage by the backend server. FIG. 5 shows a flowchart of a method for authenticating identity according to some embodiments of the present disclosure. The embodiments are described by taking the method being applicable to a terminal provided with image collection and image processing functions as an example. The method includes the following steps.

In S501, a gesture set is displayed in response to a facial feature input instruction.

The gesture set includes all gestures for converting password characters.

In some embodiments, the user needs to input her/his own facial feature in advance to start the above 2FA function. As in the identity authentication stage, the terminal randomly converts the password characters in the original password into any gestures in the gesture set, and a gesture varies when performed by different users, the terminal acquires images of all gestures of the user to improve the accuracy of gesture identification. The gestures are facial expressions or head gestures, such that the terminal extracts the facial feature in the case that the user performs the corresponding gesture. In response to receiving the facial feature input instruction, the terminal displays the gesture set to facilitate input of the gestures in order by the user.

In S502, target facial feature data corresponding to each gesture is acquired by performing feature extraction on face images collected by the camera.

In a facial feature registration stage, the terminal acquires target facial feature data for each gesture by performing feature extraction on the collected face images. Alternatively, the terminal directly transmits the collected face images to the backend server, and the backend server performs the feature extraction and stores facial feature data.

In S503, the target facial feature data and an account identifier are transmitted to the backend server.

The backend server is configured to update a database including corresponding relations among an account, a target original password, and the target facial feature data.

The terminal transmits the target facial feature data and the account identifier to the backend server, and the backend server stores the account identifier and the target facial feature data in the database in association upon receiving the facial feature data and the account identifier. The database stores information, such as the account identifier, the facial feature data, and the original password, of each account, which is used for identity authentication based on the database and the received authentication information in the subsequent identity authentication stage.

In addition, in the case that the above 2FA mechanism is adopted, the user further needs to input the original password. The original password is input prior to the collection of the target facial feature data or upon the collection of the target facial feature data, which is not limited in the embodiments of the present disclosure.

In S504, password conversion prompt information is displayed in response to an identity verification instruction.

In S505, facial feature data is acquired by performing facial feature extraction on identity verification images collected by the camera.

In S506, a gesture sequence is acquired by performing activity detection on the identity verification images.

In S507, the original password is acquired by performing password conversion on the gesture sequence.

For specific embodiments of S504 to S507, reference may be made to S201 to S204, which are not repeated again in the embodiments of the present disclosure.

In S508, the original password and the facial feature data are transmitted to the backend server.

The backend server is configured to perform identity authentication based on the original password and the facial feature data.

In some embodiments, upon acquiring the original password input by a person subjected to identity authentication and the facial feature data, the terminal transmits the two types of authentication information to the backend server simultaneously, such that the backend server performs two types of authentications simultaneously, and determines the final identity authentication result based on two types of authentication results. Alternatively, upon acquiring the original password input by the person subjected to identity authentication and the facial feature data, the terminal first transmits one of the two types of authentication information to the backend server. In the case that the backend server confirms that the authentication based on the one of the two types of authentication information succeeds, the terminal transmits the other of the two types of authentication information to the backend server; and in the case that the authentication of the first type of authentication information fails, the terminal directly confirms authentication failure, without transmitting the second type of authentication information, such that the authentication efficiency is improved in the case that the accuracy and the security of identity authentication are improved.

Upon acquiring the original password and the facial feature data, the terminal first transmits one type of authentication information, and then transmits another type of authentication information in the case that the authentication of the authentication information succeeds. In some embodiments, the terminal first transmits the original password for password authentication, and S508 includes the following steps.

In S508a, the original password and an account identifier of a current login account are transmitted to the backend server, where the backend server is configured to determine a first identity authentication result based on the target original password corresponding to the current login account in the database.

The terminal transmits the account identifier (such as a user name) of the current login account and the converted original password to the backend server. The backend server searches in the database based on the received account identifier to acquire the target original password corresponding to the account identifier, and compares the target original password with the original password from the terminal. In the case that the target original password is completely consistent with the original password, the backend server confirms password authentication success; and in the case that the target original password is not completely consistent with the original password, the backend server confirms password authentication failure. The backend server transmits the first identity authentication result to the terminal.

In S508b, the facial feature data is transmitted to the backend server in response to receipt of the first identity authentication result from the backend server indicating password authentication success, where the backend server is configured to determine a second identity authentication result based on the target facial feature data corresponding to the current login account in the database.

In response to receiving the first identity authentication result defined to indicate the password authentication success, the terminal transmits the facial feature data to the backend server. The backend server searches in the database based on the account identifier to acquire the target facial feature data corresponding to the account identifier. The backend server determines the second identity authentication result by performing feature comparison on the target facial feature data and the facial feature data of the person subjected to identity authentication from the terminal.

In some embodiments, a similarity threshold is set in the backend server. In the case that a similarity between the target facial feature data and the facial feature data of the person subjected to identity authentication from the terminal is greater than the similarity threshold, the backend server confirms face authentication success; and in the case that the similarity between the target facial feature data and the facial feature data of the person subjected to identity authentication from the terminal is less than the similarity threshold, the backend server confirms face authentication failure. The backend server transmits the second identity authentication result to the terminal.

Subsequent to S508a, the method for authenticating identity according to the embodiments of the present disclosure further includes the following step:

determining identity authentication failure and canceling transmission of the facial feature data in response to receiving the first identity authentication result from the backend server indicating face authentication failure.

In the case that the first identity authentication result indicates password authentication failure, the terminal does not transmit the facial feature data, and directly confirms the final result as authentication failure, such that the volume of transmitted data is reduced, and the efficiency of identity authentication is improved.

In some embodiments, the terminal first transmits the facial feature data for voiceprint authentication, and S508 further includes the following steps.

In S508c, the facial feature data and the account identifier of the current login account are transmitted to the backend server, where the backend server is configured to determine a third identity authentication result based on the target facial feature data corresponding to the current login account in the database.

The terminal transmits the account identifier (such as the name of the user) of the current login account and the extracted facial feature data to the backend server. The backend server searches in the database based on the received account identifier to acquire the target facial feature data corresponding to the account identifier. The backend server determines the third identity authentication result by performing feature comparison on the target facial feature data and the facial feature data of the person subjected to identity authentication from the terminal.

In S508d, the original password is transmitted to the backend server in response to receipt of the third identity authentication result from the backend server indicating face authentication success, where the backend server is configured to determine a fourth identity authentication result based on the target original password corresponding to the current login account in the database.

In response to receiving the third identity authentication result defined to indicate the face authentication success, the terminal transmits the original password to the backend server. The backend server searches in the database based on the account identifier to acquire the target original password corresponding to the account identifier, and compares the target original password with the original password from the terminal. In the case that the target original password is completely consistent with the original password, the backend server confirms password authentication success; and in the case that the target original password is not completely consistent with the original password, the backend server confirms password authentication failure. The backend server transmits the fourth identity authentication result to the terminal.

Subsequent to S508c, the method for authenticating identity according to the embodiments of the present disclosure further includes the following step:

determining identity authentication failure and canceling transmission of the original password in response to receiving the third identity authentication result from the backend server indicating face authentication failure.

In S509, an identity authentication result from the backend server is received, where the identity authentication result is defined to indicate authentication success or authentication failure.

In the case that the terminal transmits the two types of authentication information, that is, the facial feature data and the original password, to the backend server simultaneously, the terminal determines the authentication success or the authentication failure based on the identity authentication result from the backend server at one time. In the case that the terminal transmits one of the two types of authentication information first, the identity authentication failure is immediately determined in response to receipt of the first identity authentication result or the third identity authentication result indicating the authentication failure, or, the authentication success or the authentication failure is determined based on the second identity authentication result or the fourth identity authentication result.

In the embodiments of the present disclosure, the terminal transmits the original password and the facial feature data to the backend server, such that the backend server performs identity authentication based on the database, and the security and the confidentiality of user information are improved. In addition, the terminal first transmits one type of authentication information to the backend server, determines whether to transmit the second type of authentication information based on the authentication result of the first type of authentication information, and directly determines the authentication result in the case of authentication failure of the first type of authentication information, such that the transmission and the leakage of data are reduced as much as possible, and the efficiency of identity authentication is improved.

Figure 6:
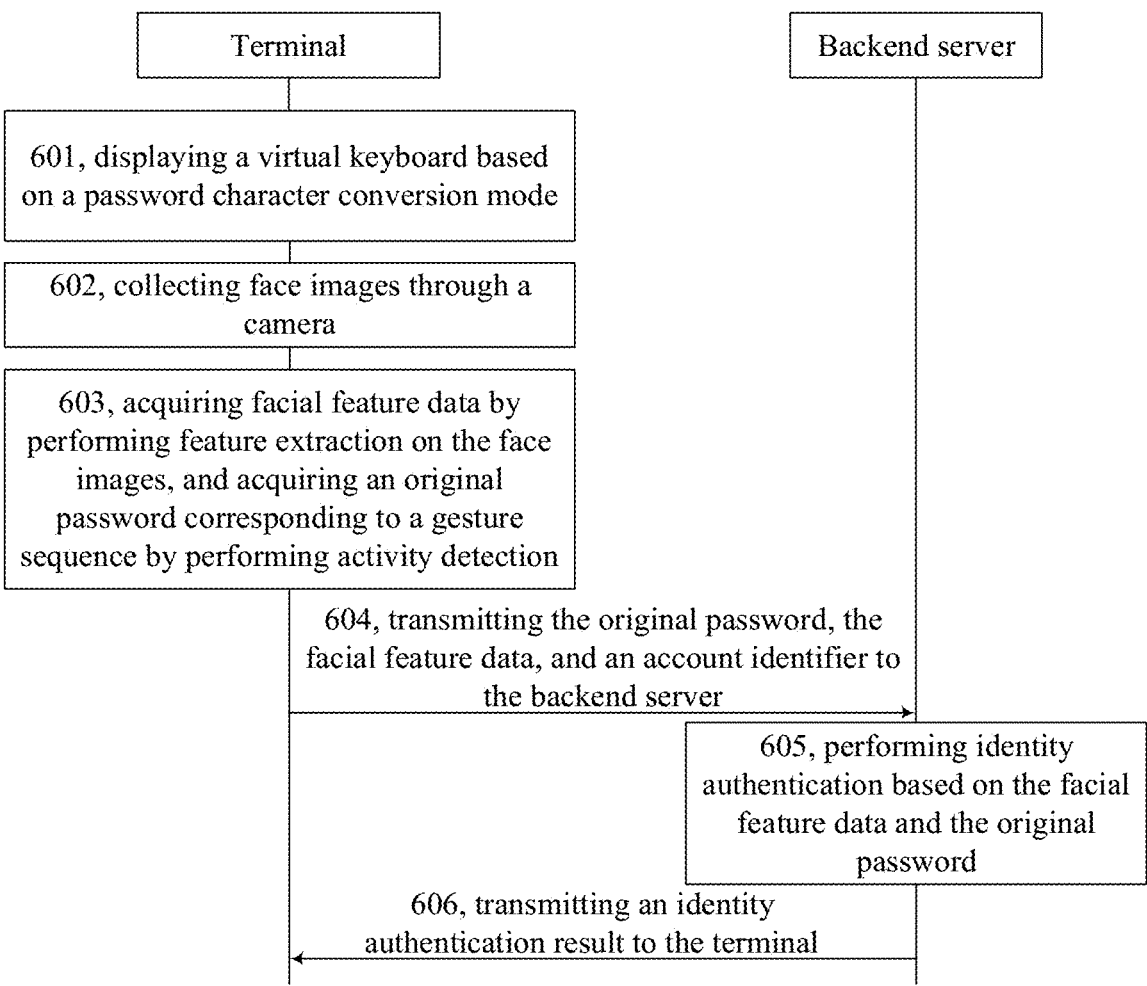
FIG. 6 shows a flowchart of a method for authenticating identity according to some embodiments of the present disclosure.

In conjunction with the foregoing embodiments, in some embodiments, a process in which the terminal and the backend server perform a 2FA task is shown in FIG. 6. The process includes the following steps.

In S601, the terminal displays the virtual keyboard based on the password character conversion mode.

In S602, the terminal collects the face images through the camera.

In S603, the terminal acquires the facial feature data by performing feature extraction on the face images and acquires the original password corresponding to the gesture sequence by performing activity detection.

In S604, the terminal transmits the original password, the facial feature data, and the account identifier to the backend server.

In S605, the backend server performs identity authentication based on the facial feature data and the original password.

In S606, the backend server transmits the identity authentication result to the terminal.

Figure 7:
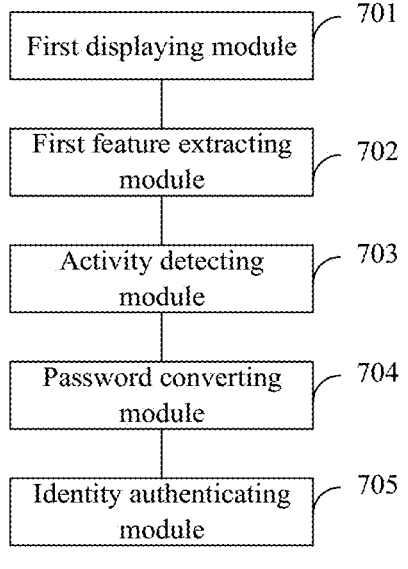
FIG. 7 shows a structural block diagram of an apparatus for authenticating identity according to some embodiments of the present disclosure.

FIG. 7 is a structural block diagram of an apparatus for authenticating identity according to some exemplary embodiments of the present disclosure. The apparatus includes the following modules.

A first displaying module 701 is configured to display password conversion prompt information in response to an identity verification instruction, where the password conversion prompt information is defined to prompt to convert password characters in an original password into gestures, different password characters correspond to different gestures, and a password character conversion mode indicated by the password conversion prompt information is randomly generated.

A first feature extracting module 702 is configured to acquire facial feature data by performing facial feature extraction on identity verification images collected by a camera.

An activity detecting module 703 is configured to acquire a gesture sequence by performing activity detection on the identity verification images.

A password converting module 704 is configured to acquire the original password by performing password conversion on the gesture sequence.

An identity authenticating module 705 is configured to perform identity authentication based on the original password and the facial feature data.

In some embodiments, the first displaying module 701 includes the following units.

A generating unit is configured to generate a target random mapping function in response to the identity verification instruction, where a random mapping function is a function defined to randomly map characters into gestures.

A displaying unit is configured to display a virtual keyboard based on the target random mapping function, where the password conversion prompt information corresponding to the target random mapping function is displayed in the virtual keyboard.

The password converting module 704 includes the following unit.

A converting unit is configured to acquire the original password by performing the password conversion on the gesture sequence based on the target random mapping function.

In some embodiments, the displaying unit is further configured to:

determine a password converting unit based on the target random mapping function, where the password converting unit includes one of the password characters and a gesture corresponding to the one of the password characters in the target random mapping function; and display the password converting unit in the virtual keyboard based on a first display mode corresponding to the one of the password characters and a second display mode corresponding to a gesture identifier of the gesture, where the first display mode is different from the second display mode.

In some embodiments, the displaying unit is further configured to:

determine a first display position of the one of the password characters in the virtual keyboard; and display the password converting unit corresponding to each one of the password characters in the virtual keyboard according to the first display position based on the first display mode and the second display mode.

In some embodiments, the displaying unit is further configured to:

display the one of the password characters in the virtual keyboard based on a first display position of the one of the password characters in the virtual keyboard and the first display mode;

determine, in response to a conversion mode display operation, a second display position of the gesture identifier in the virtual keyboard based on the one of the password characters corresponding to the gesture identifier in the password converting unit; and display the gesture identifier in the virtual keyboard according to the second display position based on the second display mode.

In some embodiments, the first display mode is different from the second display mode by at least one of the following:

A type difference is present between the one of the password characters and a character of the gesture identifier.

A display color difference is present between the one of the password characters and the gesture identifier.

A display font difference is present between the one of the password characters and the gesture identifier.

A display font size difference is present between the one of the password characters and the gesture identifier.

A display special effect difference is present between the one of the password characters and the gesture identifier.

In some embodiments, the gesture includes a facial expression and a head gesture.

The apparatus further includes the following modules.

A second displaying module is configured to display a gesture set in response to a facial feature input instruction, where the gesture set includes all gestures for the converting password characters.

A feature collecting module is configured to acquire target facial feature data corresponding to each one of the gestures by performing feature extraction on face images collected by the camera.

An information transmitting module is configured to transmit the target facial feature data and an account identifier to a backend server, where the backend server is configured to update a database including corresponding relations among an account, a target original password, and the target facial feature data.

In some embodiments, the identity authenticating module 705 includes the following units.

An information transmitting unit is configured to transmit the original password and the facial feature data to the backend server, where the backend server is configured to perform the identity authentication based on the original password and the facial feature data.

An information receiving unit is configured to receive an identity authentication result from the backend server, where the identity authentication result indicates authentication success or authentication failure.

In some embodiments, the information transmitting unit is further configured to:

transmit the original password and an account identifier of a current login account to the backend server, where the backend server is configured to determine a first identity authentication result based on the target original password corresponding to the current login account in the database; and transmit the facial feature data to the backend server in response to receiving the first identity authentication result from the backend server indicating password authentication success, where the backend server is configured to determine a second identity authentication result based on the target facial feature data corresponding to the current login account in the database.

The apparatus further includes the following module.

A first determining module is configured to determine identity authentication failure and cancel transmission of the facial feature data in response to receiving the first identity authentication result from the backend server indicating password authentication failure.

In some embodiments, the information transmitting unit is further configured to:

transmit the facial feature data and an account identifier of a current login account to the backend server, where the backend server is configured to determine a third identity authentication result based on the target facial feature data corresponding to the current login account in the database; and transmit the original password to the backend server in response to receiving the third identity authentication result from the backend server indicating face authentication success, where the backend server is configured to determine a fourth identity authentication result based on the target original password corresponding to the current login account in the database.

The apparatus further includes the following module.

A second determining module is configured to determine identity authentication failure and cancel transmission of the original password in response to receiving the third identity authentication result from the backend server indicating face authentication failure.

In summary, the embodiments of the present disclosure provide an identity authentication mechanism based on two authentication factors, that is, a user password and a facial feature, such that a user can complete password input and face identification simultaneously only by inputting a gesture once. Thus, the user identity authentication process is simplified, and the efficiency of identity authentication is improved. Based on a random password character conversion mode, the user inputs a random gesture sequence acquired by converting an original password, such that the original password of the user is not leaked in a password input stage, and an instant password acquired based on the correct original password can enable the authentication to succeed to protect face identification from attack of forged facial features and further improve the security and the accuracy of identity authentication are improved.

In some embodiments, a terminal is further provided. The terminal includes a processor and a memory, where the memory stores at least one instruction, at least one program, a code set, or an instruction set thereon, and the processor, when loading and executing the at least one instruction, the at least one program, the code set, or the instruction set, is caused to perform the method for authenticating identity applicable to the terminal as defined in the above embodiments.

The embodiments of the present disclosure further provide a non-transitory computer-readable storage medium storing at least one instruction therein, where the at least one instruction, when loaded and executed by a processor, causes the processor to perform the method for authenticating identity as defined in the above embodiments.

According to some embodiments of the present disclosure, a computer program product or computer program is provided. The computer program product or computer program includes computer instructions stored in a computer-readable storage medium. A processor of a terminal reads the computer instructions from the computer-readable storage medium, and the processor, when executing the computer instructions, causes the terminal to perform the method for authenticating identity provided in various embodiments of the above embodiments.

Those skilled in the art should appreciate that in one or more of the above embodiments, the functions described in the embodiments of the present disclosure may be implemented in hardware, software, firmware, or any combination thereof. The functions, when implemented in software, may be stored in a computer-readable storage medium or transmitted as one or more instructions or codes on a computer-readable storage medium. The computer-readable storage medium includes a computer storage medium and a communication medium, where the communication medium includes any medium that facilitates transfer of a computer program from one place to another. The storage medium is any available medium that is accessible by a general-purpose or special-purpose computer.

It should be noted that the information (including, but not limited to, user device information, user personal information, and the like), data (including, but not limited to, data for analysis, stored data, displayed data, and the like) and signals, which are referred to in the present disclosure, are authorized by the user or fully authorized by various parties, and the collection, use and processing of the relevant data are required to comply with relevant laws and regulations and standards in relevant countries and regions. For example, the account identifiers, the original passwords, the facial feature data, and the like involved in the present disclosure are all acquired with adequate authorization.

Described above are merely optional embodiments of the present disclosure and are not intended to limit the present disclosure. Any modifications, equivalent substitutions, improvements, and the like, made within the spirit and principle of the present disclosure should fall within the protection scope of the present disclosure.

The invention claimed is:

1. A method for authenticating identity, comprising:

generating a target random mapping function in response to an identity verification instruction, wherein the target random mapping function is a function defined to randomly map characters into gestures;

displaying a virtual keyboard based on the target random mapping function, wherein password conversion prompt information corresponding to the target random mapping function is displayed in the virtual keyboard and is defined to prompt to convert password characters in an original password into gestures, different password characters correspond to different gestures, a password character conversion mode indicated by the password conversion prompt information is randomly generated, and the password characters comprise at least one type of numbers, letters, punctuation marks, special symbols; wherein displaying the virtual keyboard based on the target random mapping function comprises: determining a password converting unit based on the target random mapping function, wherein the password converting unit comprises one of the password characters and a gesture corresponding to the one of the password characters in the target random mapping function; and displaying the password converting unit in the virtual keyboard based on a first display mode corresponding to the one of the password characters and a second display mode corresponding to a gesture identifier of the gesture, wherein the first display mode is different from the second display mode;

acquiring facial feature data by performing facial feature extraction on identity verification images collected by a camera;

acquiring a gesture sequence by performing activity detection on the identity verification images;

acquiring the original password by performing password conversion on the gesture sequence based on the target random mapping function; and performing identity authentication based on the original password and the facial feature data.

2. The method according to claim 1, wherein displaying the password converting unit in the virtual keyboard based on the first display mode corresponding to the one of the password characters and the second display mode corresponding to the gesture identifier of the gesture comprises:

determining a first display position of the one of the password characters in the virtual keyboard; and displaying the password converting unit corresponding to each of the password characters in the virtual keyboard according to the first display position based on the first display mode and the second display mode.

3. The method according to claim 1, wherein displaying the password converting unit in the virtual keyboard based on the first display mode corresponding to the one of the password characters and the second display mode corresponding to the gesture identifier of the gesture comprises:

displaying the one of the password characters in the virtual keyboard based on a first display position of the one of the password characters in the virtual keyboard and the first display mode;

determining, in response to a conversion mode display operation, a second display position of the gesture identifier in the virtual keyboard based on the one of the password characters corresponding to the gesture identifier in the password converting unit; and displaying the gesture identifier in the virtual keyboard according to the second display position based on the second display mode.

4. The method according to claim 1, wherein the first display mode is different from the second display mode by at least one of:

a type difference between the one of the password characters and a character of the gesture identifier;

a display color difference between the one of the password characters and the gesture identifier;

a display font difference between the one of the password characters and the gesture identifier;

a display font size difference between the one of the password characters and the gesture identifier; or a display special effect difference between the one of the password characters and the gesture identifier.

5. The method according to claim 1, wherein the gesture comprises a facial expression and a head gesture; and prior to displaying the virtual keyboard based on the target random mapping function, the method comprises:

displaying a gesture set in response to a facial feature input instruction, wherein the gesture set comprises all gestures for converting the password characters;

acquiring target facial feature data corresponding to each of the gestures by performing feature extraction on face images collected by the camera; and transmitting the target facial feature data and an account identifier to a backend server, wherein the backend server is configured to update a database comprising corresponding relations among an account, a target original password, and the target facial feature data.

6. The method according to claim 5, wherein performing the identity authentication based on the original password and the facial feature data comprises:

transmitting the original password and the facial feature data to the backend server, wherein the backend server is configured to perform the identity authentication based on the original password and the facial feature data; and receiving an identity authentication result from the backend server, wherein the identity authentication result indicates authentication success or authentication failure.

7. The method according to claim 6, wherein transmitting the original password and the facial feature data to the backend server comprises:

transmitting the original password and an account identifier of a current login account to the backend server, wherein the backend server is configured to determine a first identity authentication result based on the target original password corresponding to the current login account in the database; and transmitting the facial feature data to the backend server in response to receiving the first identity authentication result from the backend server indicating password authentication success, wherein the backend server is configured to determine a second identity authentication result based on the target facial feature data corresponding to the current login account in the database; and the method further comprises:

determining identity authentication failure and canceling transmission of the facial feature data in response to receiving the first identity authentication result from the backend server indicating password authentication failure.

8. The method according to claim 6, wherein transmitting the original password and the facial feature data to the backend server comprises:

transmitting the facial feature data and an account identifier of a current login account to the backend server, wherein the backend server is configured to determine a third identity authentication result based on the target facial feature data corresponding to the current login account in the database; and transmitting the original password to the backend server in response to receiving the third identity authentication result from the backend server indicating face authentication success, wherein the backend server is configured to determine a fourth identity authentication result based on the target original password corresponding to the current login account in the database; and the method further comprises:

determining identity authentication failure and canceling transmission of the original password in response to receiving the third identity authentication result from the backend server indicating face authentication failure.

9. A terminal for authenticating identity, comprising: a processor and a memory, wherein the memory stores at least one instruction, at least one program, a code set, or an instruction set thereon, and the processor, when loading and executing the at least one instruction, the at least one program, the code set, or the instruction set, is caused to:

generate a target random mapping function in response to an identity verification instruction, wherein a random mapping function is a function defined to randomly map characters into gestures;

display a virtual keyboard based on the target random mapping function, wherein password conversion prompt information corresponding to the target random mapping function is displayed in the virtual keyboard and is defined to prompt to convert password characters in an original password into gestures, different password characters correspond to different gestures, a password character conversion mode indicated by the password conversion prompt information is randomly generated, the password characters include at least one type of numbers, letters, punctuation marks, special symbols; and is further caused to: determine a password converting unit based on the target random mapping function, wherein the password converting unit comprises one of the password characters and a gesture corresponding to the one of the password characters in the target random mapping function; and display the password converting unit in the virtual keyboard based on a first display mode corresponding to the one of the password characters and a second display mode corresponding to a gesture identifier of the gesture, wherein the first display mode is different from the second display mode;

acquire facial feature data by performing facial feature extraction on identity verification images collected by a camera;

acquire a gesture sequence by performing activity detection on the identity verification images;

acquire the original password by performing password conversion on the gesture sequence based on the target random mapping function; and perform identity authentication based on the original password and the facial feature data.

10. A non-transitory computer-readable storage medium, storing at least one computer program therein, wherein the computer program, when loaded and run by a processor, causes the processor to:

generate a target random mapping function in response to an identity verification instruction, wherein a random mapping function is a function defined to randomly map characters into gestures;

display a virtual keyboard based on the target random mapping function, wherein password conversion prompt information corresponding to the target random mapping function is displayed in the virtual keyboard and is defined to prompt to convert password characters in an original password into gestures, different password characters correspond to different gestures, a password character conversion mode indicated by the password conversion prompt information is randomly generated, the password characters include at least one type of numbers, letters, punctuation marks, special symbols; and further causes the processor to: determine a password converting unit based on the target random mapping function, wherein the password converting unit comprises one of the password characters and a gesture corresponding to the one of the password characters in the target random mapping function; and display the password converting unit in the virtual keyboard based on a first display mode corresponding to the one of the password characters and a second display mode corresponding to a gesture identifier of the gesture, wherein the first display mode is different from the second display mode;

acquire facial feature data by performing facial feature extraction on identity verification images collected by a camera;

acquire a gesture sequence by performing activity detection on the identity verification images;

acquire the original password by performing password conversion on the gesture sequence based on the target random mapping function; and perform identity authentication based on the original password and the facial feature data.

11. A computer program product or computer program, comprising one or more computer instructions stored in a non-transitory computer-readable storage medium, wherein a processor of a terminal reads the one or more computer instructions from the computer-readable storage medium, and the processor, when executing the one or more computer instructions, causes the terminal to perform the method for authenticating identity as defined in claim 1.

12. The terminal for authenticating identity according to claim 9, wherein the processor, when loading and executing the at least one instruction, the at least one program, the code set, or the instruction set, is caused to:

determine a first display position of the one of the password characters in the virtual keyboard; and display the password converting unit corresponding to each of the password characters in the virtual keyboard according to the first display position based on the first display mode and the second display mode.

13. The terminal for authenticating identity according to claim 9, wherein the processor, when loading and executing the at least one instruction, the at least one program, the code set, or the instruction set, is caused to:

display the one of the password characters in the virtual keyboard based on a first display position of the one of the password characters in the virtual keyboard and the first display mode;

determine, in response to a conversion mode display operation, a second display position of the gesture identifier in the virtual keyboard based on the one of the password characters corresponding to the gesture identifier in the password converting unit; and display the gesture identifier in the virtual keyboard according to the second display position based on the second display mode.

14. The terminal for authenticating identity according to claim 9, wherein the first display mode is different from the second display mode by at least one of:

a type difference between the one of the password characters and a character of the gesture identifier;

a display color difference between the one of the password characters and the gesture identifier;

a display font difference between the one of the password characters and the gesture identifier;

a display font size difference between the one of the password characters and the gesture identifier; or a display special effect difference between the one of the password characters and the gesture identifier.

15. The terminal for authenticating identity according to claim 9, wherein the gesture comprises a facial expression and a head gesture; and the processor, when loading and executing the at least one instruction, the at least one program, the code set, or the instruction set, is caused to:

display a gesture set in response to a facial feature input instruction, wherein the gesture set comprises all gestures for converting the password characters;

acquire target facial feature data corresponding to each of the gestures by performing feature extraction on face images collected by the camera; and transmit the target facial feature data and an account identifier to a backend server, wherein the backend server is configured to update a database comprising corresponding relations among an account, a target original password, and the target facial feature data.

16. The terminal for authenticating identity according to claim 15, wherein the processor, when loading and executing the at least one instruction, the at least one program, the code set, or the instruction set, is caused to:

transmit the original password and the facial feature data to the backend server, wherein the backend server is configured to perform the identity authentication based on the original password and the facial feature data; and receive an identity authentication result from the backend server, wherein the identity authentication result indicates authentication success or authentication failure.

17. The terminal for authenticating identity according to claim 16, wherein the processor, when loading and executing the at least one instruction, the at least one program, the code set, or the instruction set, is caused to:

transmit the original password and an account identifier of a current login account to the backend server, wherein the backend server is configured to determine a first identity authentication result based on the target original password corresponding to the current login account in the database; and transmit the facial feature data to the backend server in response to receiving the first identity authentication result from the backend server indicating password authentication success, wherein the backend server is configured to determine a second identity authentication result based on the target facial feature data corresponding to the current login account in the database; and determine identity authentication failure and canceling transmission of the facial feature data in response to receiving the first identity authentication result from the backend server indicating password authentication failure.

18. The terminal for authenticating identity according to claim 16, wherein the processor, when loading and executing the at least one instruction, the at least one program, the code set, or the instruction set, is caused to:

transmit the facial feature data and an account identifier of a current login account to the backend server, wherein the backend server is configured to determine a third identity authentication result based on the target facial feature data corresponding to the current login account in the database; and transmit the original password to the backend server in response to receiving the third identity authentication result from the backend server indicating face authentication success, wherein the backend server is configured to determine a fourth identity authentication result based on the target original password corresponding to the current login account in the database; and

determining identity authentication failure and canceling transmission of the original password in response to receiving the third identity authentication result from the backend server indicating face authentication failure.

19. The non-transitory computer-readable storage medium according to claim 10, wherein the computer program, when loaded and run by a processor, causes the processor to:

determine a first display position of the one of the password characters in the virtual keyboard; and display the password converting unit corresponding to each of the password characters in the virtual keyboard according to the first display position based on the first display mode and the second display mode.

20. The non-transitory computer-readable storage medium according to claim 10, wherein the computer program, when loaded and run by a processor, causes the processor to:

display the one of the password characters in the virtual keyboard based on a first display position of the one of the password characters in the virtual keyboard and the first display mode;

determine, in response to a conversion mode display operation, a second display position of the gesture identifier in the virtual keyboard based on the one of the password characters corresponding to the gesture identifier in the password converting unit; and display the gesture identifier in the virtual keyboard according to the second display position based on the second display mode.

* * * * *